UNITED STATES PATENT OFFICE.

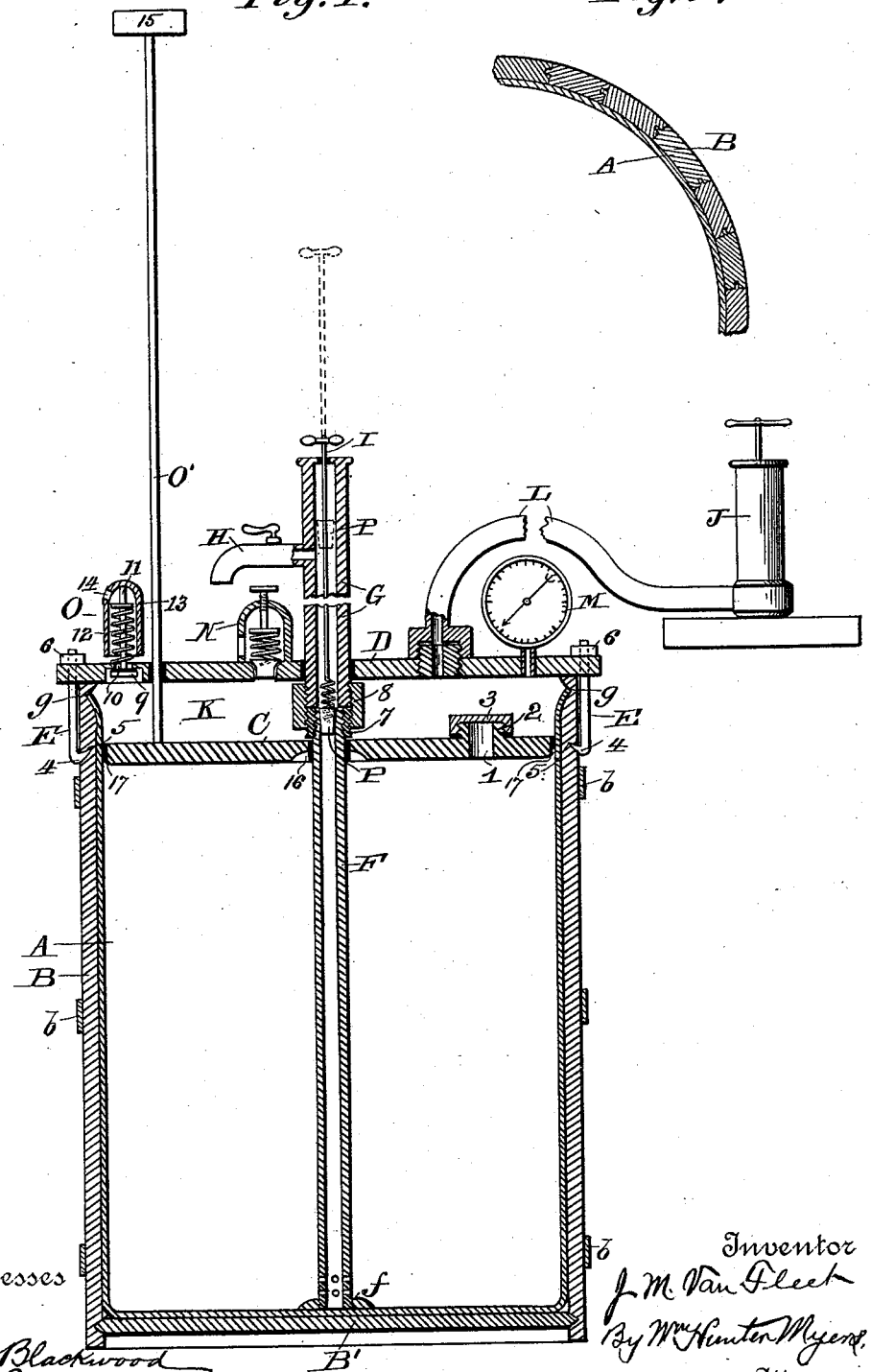

JOHN M. VAN FLEET, OF KENTON, OHIO.

BEVERAGE-VESSEL.

SPECIFICATION forming part of Letters Patent No. 523,951, dated July 31, 1894.

Application filed November 9, 1893. Serial No. 490,466. (No model.)

*To all whom it may concern:*

Be it known that I, JOHN M. VAN FLEET, a citizen of the United States, residing at Kenton, in the county of Hardin and State of Ohio, have invented certain new and useful Improvements in Beverage-Vessels, of which the following is a specification, reference being had therein to the accompanying drawings.

My invention relates to certain improvements in vessels adapted for storing, transporting, and handling gaseous beverages, particularly beer.

To keep beer fresh air must be excluded from the vessel containing it; and to insure the retention of the proper quantity of carbonic-acid gas within the beer when on draft means must be provided for exerting a regulated pressure on the liquid. If, in case the beer is drawn from the bottom of the vessel, the pressure is too light, the gas will rise to the surface, thus rendering the beer being drawn practically stale; and if the beer is drawn from the upper part of the vessel under too light pressure the gas accumulated on its surface will escape free. On the other hand, if too much pressure is exerted, whether the beer be drawn from either the top or bottom of the vessel, the gas will be unduly agitated, with the result that when the beer is drawn into a glass it will be in a condition termed "wild" and useless.

To provide improved means for excluding air from the interior of the vessel, for withdrawing the beverage from the vessel, and for exerting a regulated pressure on the beverage within the vessel is the object of my invention.

The invention will first be described in connection with the accompanying drawings, and then pointed out in the claims.

Figure 1 of the drawings is a vertical sectional view, partly in elevation, of my improved beverage-vessel. Fig. 2 is a partial horizontal sectional view, showing the manner of joining the staves together.

Referring to the drawings, A is a metal cylinder, closed at one end, preferably stamped up from a single piece of thin steel; and B are wooden staves surrounding the cylinder, a wooden bottom B' covering the bottom of the cylinder. The upper edge of the cylinder is flared outwardly and takes into a groove $g$ cut in the staves, to prevent the outward movement of the cylinder. To prevent oxidation of the metal the inner surface of the cylinder should be glazed; and in order to guard against fracturing the glazing by rough handling of the vessel, as might occur if one or more of the staves should become misplaced, I join the staves together by tongue-and-groove joints, as seen in Fig. 2. Hoops $b$ bind the staves to the cylinder.

C is the follower, made of any suitable metal, its periphery being provided with a packing to cause an air-tight fit of the follower in the cylinder. In the follower there is a filling-opening 1, serving the purpose of the usual bung-hole; and on the upper side of the follower, directly over the opening 1, there is cast or otherwise formed a tubular projection 2, screw-threaded on its outer side, to receive a screw-cap 3 for closing said opening.

D is a cap-plate, removably secured to the top of the vessel, preferably by means of a series of clamps E, having hooks 4 at their lower ends, adapted to engage with recesses 5 in the staves, the upper screw-threaded ends of the clamps passing through the cap-plate and being provided with nuts 6.

F is the service-pipe, the lower end of which is screwed into a socket $f$ secured on the bottom of the cylinder, the pipe being perforated to permit the ingress of liquid. This pipe, which passes through the follower C, is of such length that when the latter is fully withdrawn to its upper limit, its upper end will be slightly above the follower; and on this end of the pipe is screwed an annular ring 7, which serves as a stop to limit the upward movement of the follower. The ring 7 is also screw-threaded exteriorly, to receive one end of an interiorly screw-threaded coupler 8, into the upper end of which is screwed the lower end of the tap-pipe G, which is somewhat greater in diameter than the service-pipe. The tap-pipe is provided with a faucet H.

I is a cork-puller in the tap-pipe, it being passed through a suitably-packed opening in the upper end of said pipe.

J is an air-pump, communicating with the air-chamber K, formed by the follower and cap-plate, by means of a pipe L.

M is the pressure-gage carried by the cap-plate, for indicating the pressure on the follower.

N is an ordinary automatic escape-valve, through which the air in the air-chamber is allowed to escape when the pressure rises above the predetermined point at which the valve has been set to operate.

It is very desirable that some means be provided for indicating when the vessel is about empty, and for this purpose I have devised an automatic alarm, constructed and operated as follows:

O is a whistle, comprising a valve 9, normally closing an opening 10 in the cap-plate D; 11, the valve-stem, secured to the valve; 12, a coiled spring on the valve-stem; and 13 a thin metal bell resting on the upper end of the valve-stem and having a small orifice 14 near its top, the lower end of the bell being normally a slight distance above the top of the cap-plate. O' is a rod passed through a packed opening in the cap-plate, its lower end, when the vessel is in use, resting on the top of the follower. This rod carries a weight 15 on its upper end, and is of such length that when the follower has nearly reached the bottom of the vessel the weight will come into contact with the top of the whistle-bell and in its further descent will press the bell down onto the top of the cap-plate D, when valve 9 will be opened, allowing the air to rush up into the bell and out of its orifice 14 with force sufficient to cause a loud whistling sound.

The follower is recessed on its under side at 16, so that it will overlie the socket on the bottom of the cylinder; and the under edge of the follower is rounded, as at 17, to conform to the rounded inner edge of the cylinder-bottom.

P is a cork placed in the upper end of the service-pipe at the time when the vessel is filled.

Assuming the vessel to be filled and ready for use, the various parts being in the positions shown in Fig. 1, the bar-tender, by means of the cork-puller, first draws the cork P out of the service-pipe and up into the tap-pipe, above the faucet, as shown in dotted lines, this being easily done as the tap-pipe is somewhat larger than the service-pipe. He then operates the air-pump to put pressure on the follower and, incidentally, on the liquid. It is important, in order to obtain the best results, to keep the pressure on the liquid uniform at all times while dispensing it—as well when the cylinder is nearly empty as when quite full. Experience will demonstrate what the pressure should be; and when the proper pressure is determined it may easily be maintained by setting the escape-valve and occasionally observing the gage. The follower being guided centrally by the service-pipe, and the air-pressure being exerted equally throughout its area, the even and smooth movement of the follower within the cylinder is assured, no flange or other device for preventing it from canting and binding being required. Of course, when the liquid is under pressure it will enter the service pipe through the perforations in its lower end and be forced up through the tap-pipe to the faucet, ready at all times to be drawn off for use.

When the vessel is empty and ready to be sent back to the brewer's, the tap-pipe and the coupler are disconnected from the ring on the service-pipe, when the clamps are loosened and the cap-plate, with all its attached parts, removed from the vessel, the cork in the tap-pipe being meanwhile pushed out and thrown away. The pipe L of the air-pump is then disconnected from the cap-plate and connected with the service-pipe, when air may be forced, through the openings in said pipe, under the follower, causing it to be pushed back until stopped by the ring 7 on the service-pipe, this being the normal position of the follower. Pipe L is then disconnected from the service-pipe and again connected with the cap-plate, when the latter is ready to be applied to the next vessel to be put in use.

Having thus described my invention, what I claim as new, and desire to secure by Letters Patent, is—

1. In a beverage-vessel, a cylinder permanently closed at one end and provided with a removable cap-plate at its other end, said plate having an air inlet in combination with a follower within the cylinder, a service-pipe secured to the bottom of the cylinder and passed through the follower, and an air-forcing apparatus in communication with the inlet in the cap plate substantially as described and for the purposes stated.

2. In a beverage-vessel, a cylinder permanently closed at one end and provided with a removable cap-plate at its other end, said plate having an air inlet in combination with a follower within the cylinder, a service-pipe secured to the bottom of the cylinder and passed centrally through and serving as a guide for the follower, and an air-forcing apparatus in communication with the inlet in the cap-plate, substantially as described and for the purposes stated.

3. In a beverage-vessel, a cylinder permanently closed at one end and provided with a removable cap-plate at its other end, in combination with a follower within the cylinder, a service-pipe secured to the bottom of the cylinder, passed through the follower, and provided at its outer end with a stop for limiting the outward movement of the latter, means for exerting pressure on the follower, and an automatically-actuated escape-valve for relieving pressure on the follower.

4. In a beverage-vessel, a cylinder permanently closed at one end and provided with a removable cap-plate at its other end, in combination with a follower within the cylinder, means for exerting pressure on the follower, a service-pipe secured at its lower end to the bottom of the cylinder and passed through the follower, a stopper for temporarily closing the upper end of the service-pipe, a tap-pipe connected to the service pipe, and a device located in the tap-pipe for withdrawing said stopper.

5. In a beverage-vessel, a cylinder permanently closed at one end and provided with a removable cap-plate at its other end, in combination with a follower within the cylinder, means for forcing air between the cap-plate and the follower, an automatically-actuated escape-valve, and an automatically-actuated alarm for indicating when the follower has reached the bottom of the vessel.

6. In a beverage-vessel, a cylinder permanently closed at one end and provided with a removable cap-plate at its other end, in combination with a follower within the cylinder, means for forcing air between the cap-plate and the follower, a pressure-gage carried by the cap-plate, an automatically-actuated escape-valve, and an automatically-actuated alarm for indicating when the follower has reached the bottom of the vessel.

7. In a beverage-vessel, a cylinder permanently closed at one end and provided with a removable cap-plate at its other end, in combination with a follower within the cylinder, a service-pipe passed centrally through the follower and secured at its lower end to the bottom of the cylinder, a tap-pipe passed through the cap-plate and secured to the service-pipe, and means for forcing air between the cap-plate and follower.

8. In a beverage-vessel, a cylinder permanently closed at one end and provided with a removable cap-plate at its other end, in combination with a follower within the cylinder, said follower having a filling-opening, a service-pipe passed centrally through the follower and secured at its lower end to the bottom of the cylinder, its upper end being provided with an annular ring, a tap-pipe passed through the cap-plate and coupled to the ring on the service-pipe, and means for forcing air between the cap-plate and follower.

In testimony whereof I affix my signature in presence of two witnesses.

JOHN M. VAN FLEET.

Witnesses:
WM. HUNTER MYERS,
JOS. H. BLACKWOOD.